(12) United States Patent
Wang

(10) Patent No.: US 12,436,677 B2
(45) Date of Patent: Oct. 7, 2025

(54) APPLICATION PROCESS CONTEXT COMPRESSION AND REPLAY

(71) Applicant: Sony Interactive Entertainment Inc., Tokyo (JP)

(72) Inventor: Jason Wang, Palo Alto, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 487 days.

(21) Appl. No.: 17/836,625

(22) Filed: Jun. 9, 2022

(65) Prior Publication Data
US 2023/0400980 A1    Dec. 14, 2023

(51) Int. Cl.
*G06F 3/06* (2006.01)
*G06T 9/00* (2006.01)
*H03M 7/30* (2006.01)
*H04N 1/413* (2006.01)

(52) U.S. Cl.
CPC .......... *G06F 3/0604* (2013.01); *G06F 3/0653* (2013.01); *G06F 3/0673* (2013.01); *G06T 9/005* (2013.01); *H03M 7/6058* (2013.01); *H03M 7/702* (2013.01); *H04N 1/413* (2013.01)

(58) Field of Classification Search
CPC ..... H03M 7/6058; H03M 7/702; G06T 9/005; G06F 3/0604; G06F 3/0653; G06F 3/0673
USPC ..................................................... 341/50, 51
See application file for complete search history.

(56) References Cited

U.S. PATENT DOCUMENTS

| | | | |
|---|---|---|---|
| 6,650,329 B1 | 11/2003 | Koike | |
| 2007/0105607 A1 | 5/2007 | Russell et al. | |
| 2010/0166068 A1 | 7/2010 | Perlman et al. | |
| 2015/0293700 A1* | 10/2015 | Sasaki | G06F 3/0686 711/113 |

FOREIGN PATENT DOCUMENTS

AU    2018250308 A1 * 10/2019 ........... H04N 19/132

OTHER PUBLICATIONS

International Search Report and Written Opinion mailed Jun. 30, 2023 for International Patent Application No. PCT/US23/18385.
Wagner, C. Developing Your Own Replay System, Informa Game Developer. Online Article. Feb. 4, 2004 [retrieved on May 30, 2023] Retrieved from the Internet; entire document.

(Continued)

*Primary Examiner* — Peguy Jean Pierre
(74) *Attorney, Agent, or Firm* — Kilpatrick Townsend & Stockton LLP

(57) ABSTRACT

Application state data from a main memory may be compressed and the compressed data may be written to a first location in a mass storage. Updated application state data is generated, and the updated application state data is compressed from the main memory. The updated application state data is then written to a second location in the mass storage. Processing may then be paused on the application state data and updated application state data. The compressed application state data and compressed updated application state data stored in the mass storage is scanned and information corresponding to compressed application state data and updated compressed application state data stored in the mass storage is displayed using information from the scanned compressed application state data and compressed updated application state data.

25 Claims, 10 Drawing Sheets

(56) References Cited

OTHER PUBLICATIONS

Wikipedia Context Tree Weighting—Wikipedia, the free encyclopedia. Apr. 6, 2022 [retrieved on Jun. 2, 2023]. Retrieved from ; entire document, especially p. 1, para 3.

Wikipedia Lempel-Ziv-Welch—Wikipedia, the free encyclopedia. Apr. 6, 2022 [retrieved on May 31, 2023]. Retrieved from; entire document, especially p. 1, para 3.

Paul R. Wilson, Scott F. Kaplan, and Yannis Smaragdakis, Proceedings of the USENIX Annual Technical Conference, "The Case for Compressed Caching in Virtual Memory Systems", Monterey, California, USA, Jun. 6-11, 1999.

\* cited by examiner

APPLICATION PROCESS CONTEXT COMPRESSION AND REPLAY

FIELD OF THE DISCLOSURE

Aspects of the present disclosure are related to memory management, specifically related to application replay from compressed main memory pages.

BACKGROUND OF THE DISCLOSURE

Modern computer architectures use main memory to store data that is operated on by the processor. The processor may transfer information from the main memory to its registers to perform an operation and then transfer the register contents back to the main memory. The main memory as such, contains application state data which is a snapshot of the state of data being processed by the processor that has been moved from registers to main memory. The application state data may include application context such as processor registers, stack, and heap. Main memory data is periodically saved to a non-volatile memory, also known as mass storage, e.g., a hard disk drive (HDD) or solid state drive (SSD). During processing the processor may update application state data in the main memory without updating data stored in the mass storage; this is sometimes called a dirty page because the page data has been updated without being written to the mass storage. Application state data is stored in the main memory in one or multiple pages and each page is made up of multiple fixed size page frames or variable sized page segments. The processor maintains an address buffer that holds the locations of application state data within the main memory.

Many operating systems implement memory swapping. This allows the operating systems to increase the size of main memory without having additional physical memory. Memory swapping uses a portion of non-volatile memory storage space as main memory. Swapping pulls application state data from main memory and writes it to a space in non-volatile memory while application processing is paused. The operating system may swap application state data written to this area of non-volatile memory back and forth between physical memory of the main memory and the area of the non-volatile memory when changing applications being processed. Swapping a page from physical memory to non-volatile storage and restoring a page from non-volatile memory to physical memory are governed by two different algorithms. When an application tries to allocate a page of memory, but the physical memory is full, the operating system will pause the application and pick a page not actively used to copy to non-volatile memory. Then the operating system will reuse that page for memory allocation and resume the application. Another reason to swap pages out is an application context switch. If one application is switched out, its memory pages are also swapped out to make room for the application being swapped in.

It has been proposed that increased efficiency of memory management could be achieved by compressing application data stored in a part of the main memory. Various compression techniques have been proposed to decrease the size of application state data stored in the main memory. These techniques have not been adopted by the industry at large.

Video games and other applications use independent points programmed within the application to save state data of the application. These are often referred to as 'game saves,' 'save states,' or 'save files.' These save files may be updated or created periodically by the game application or at the will of the user depending on the implementation. Creation of save data operates independently of processor memory management and creates save data on the mass storage independent of the main memory or memory swapping. The contents of the save data are variable depending upon the implementation with no standardization between applications.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Though it has been shown that gains in memory management efficiency can be had using page compression, these techniques have not been widely adopted due to a lack of hardware resources. Now, fast multi-core processors are common and hardware resources are plentiful enough to implement page compression without impacting processing.

Memory management systems and other applications have yet to take advantage of memory compression.

While prior proposed methods of memory compression involve direct compression of memory pages to main memory during processing, according to aspects of the present disclosure, greater system functionality may be gained by compression and retention of compressed memory pages in mass storage. Retention of compressed memory pages in mass storage allows for application replay by which the user can wind back processing of the application to a prior point during processing. For example, and without limitation, retention of compressed memory pages in mass storage may allow playback of a videogame from a previous point within a videogame without save games, or restarting of a simulator program to a point during the simulation without save states, or undoing changes made in a drawing or writing program where the previous state was unsaved, or in program debugging the retained compressed application states may be reviewed to determine application context and find bugs, or retained compressed application states may be used to recover lost application data after a system crash. The benefits of retaining compressed application states are quite numerous and allow the addition of functions to programs that previously lacked the capability of save states or have infrequent save points. Additionally, the compressed application states include more information than application created save files and may allow for more granular application replay or more user-friendly application replay points.

Method

Figure 1:
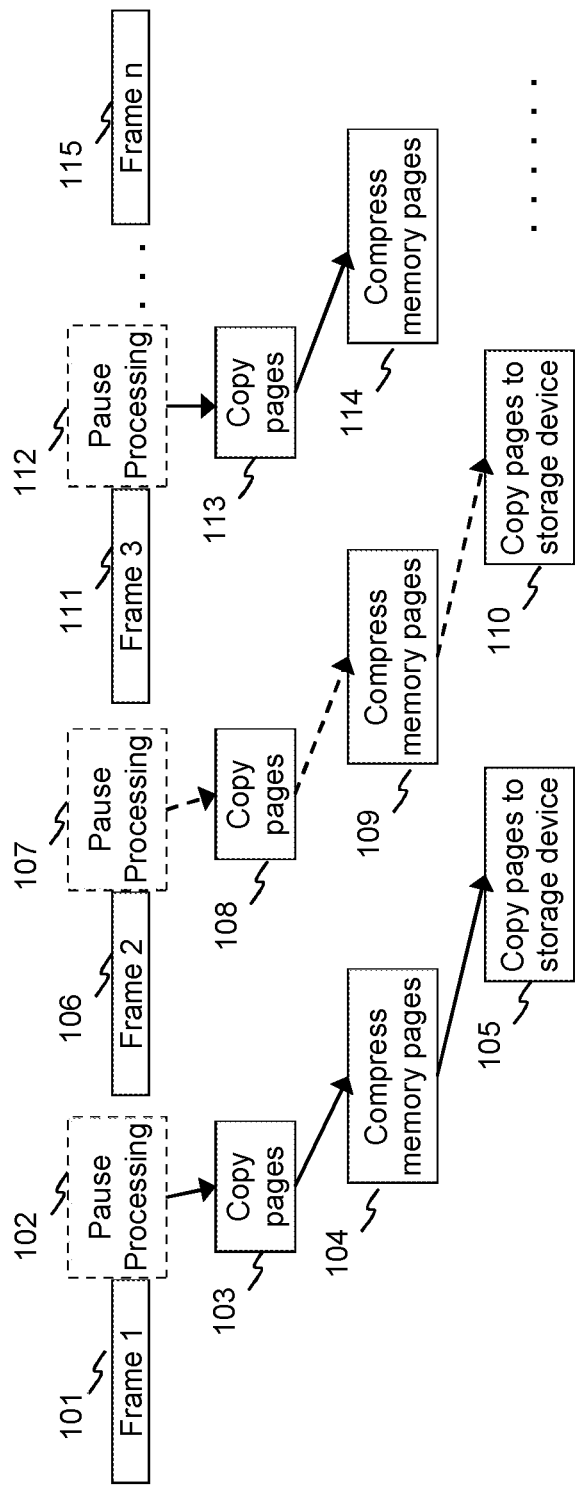
FIG. 1 is a timing diagram showing application state compression according to an aspect of the present disclosure.

FIG. 1 depicts an implementation of application state compression according to an aspect of the present disclosure. In this particular implementation, an application, e.g., a game application, performs processing over predetermined time intervals and produces output in the form of data corresponding to an image frame at the end of each interval. However, aspects of the present disclosure are not limited to just such implementations. As shown, initially, the system may perform processing and generate a first image frame 101. After generation of the first image frame, the system pauses at 102 and the application state data paged in the main memory is copied at 103 to a virtualized main memory space at a first location in mass storage. The application state data in main memory pages is then compressed at 104 and copied at 105 to a second location in mass storage. As used herein, and as generally understood by those skilled in the art, "state" is a general term to represent all the necessary information to define a system. Application "context" more specifically refers to all necessary information to restore a computer application.

The processor resumes processing the application state data and a second image frame 106 is generated. Generation of the second image frame 106 may include generating updated application state data stored in the main memory. In some implementations the application process may be paused at 107 and the updated application state data generated with the second frame is copied from physical main memory to virtual main memory at the first location in mass storage at 108. The application state data generated with the second frame may then be compressed at 109 and copied to a third location in mass storage at 110.

In alternative implementations one or more image frames may be processed with corresponding updated application state data or application data without compressing the memory pages of the updated application state data. Thus, elements 107 through 110 are shown in dashed lines indicating that the operation is optional depending upon the implementation. In another alternative implementation, the application state data copied at 103 and the updated application state data copied at 108 could also be stored in physical memory. The copied pages corresponding to the state data are snapshots of the application. The memory compression may be done with the snapshots in physical memory.

As shown, a third image frame 111 may be generated with updated application state data. The processing may then be paused at 112 and the memory pages corresponding to the updated application state data may be copied to the virtual main memory space at the first location in mass storage at 113. The updated application state data generated with the third image frame may then be compressed at 114 and copied to a fourth location in mass storage. Alternatively, if the prior updated application state data was not compressed, the compressed updated application state data may be copied to a third location in mass storage. This process may continue up to an n-th image 115, where n is the number of image frames generated while running the application.

As shown in the FIG. 1, in some implementations, the pause in processing may only last long enough to copy the application state data from main memory to a virtual main memory space. According to some aspects of the present disclosure parallel processing with the processor (e.g., a second thread, core, or processing unit), GPU, discrete codec, etc. may be used to compress and copy the application state data to the mass storage device outside of the swap operation. In some implementations, a processor other than the CPU, e.g., the GPU may be used for decompression of compressed application state data or compressed updated application state data.

Additionally, it should be noted that, in some cases processed application state data may be saved to mass storage independently of the presently disclosed compressed paging method. For example, as noted above, the operating system may swap some inactive pages out of physical memory. If these pages are "clean", i.e., unchanged since the state for the previous interval or frame, they can be directly compressed and stored without restoring the pages back to physical memory. But, a page is "dirty", i.e. has changed since the state for the previous interval or frame, the latest memory content from physical memory must be chosen and stored. In such situations a "clean page" flag and "dirty page" flag could be used as indicators to help the memory compressor. If a page can stay as clean after one processing interval, e.g., one frame iteration, the compressor can remove this page from the current frame context and only use an index to refer the page to the previous frame context. Otherwise, store dirty pages are stored with the context for the current interval, e.g., the current frame. When using "dirty page" flags it is desirable that page memory swaps should be synchronized with application state compressor operations.

If application state compressor is running together with virtual memory management, memory page swapping could be performed in synchronization with application state compression. In other words, the operating system only does page memory swapping when application compressor needs that page memory for compression. For this case, a dirty page flag means that a page is changed between application state data and updated application state data. Alternatively, if the operating system swaps memory pages independently from application state compressor, a dirty page is just a page that has changed since the last page swap, but the last swapping timing is independent from application state data compression and updated application state compression. In such a situation, a dirty page flag is not useful to determine whether the data on the flagged page has changed and the application compressor should always assume that the data is changed.

Figure 2:
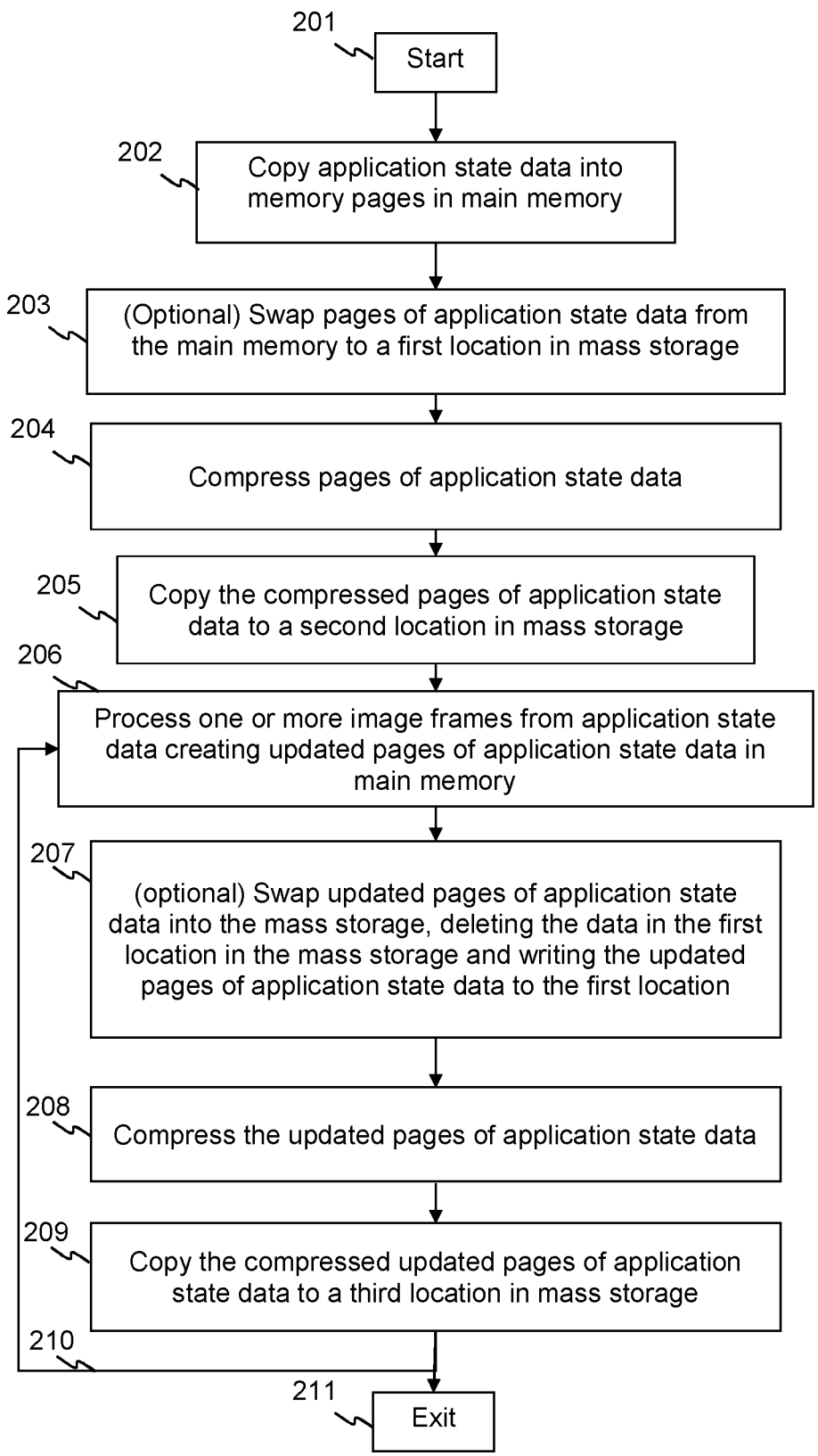
FIG. 2 is a flow diagram showing application state compression in the method for application state compression and replay according to an aspect of the present disclosure.

As noted above, aspects of the present disclosure are not limited to the implementation depicted in FIG. 1 alone. FIG. 2 more generally illustrates details of application state compression according to an aspect of the present disclosure. The method for application state compression and replay may start 201 with selection of an application. The processor may pull application data from the mass storage to the main memory for processing. The processor may then process the application and generate application state data. After pausing processing, the application state data is copied from registers of the processor into pages of the main memory, as indicated at 202. In some optional implementations the processor may perform a swap operation by copying the application state data from physical main memory to a first location, e.g., a virtual memory space in the mass storage or a location in main memory at 203. The processor then reads and compresses the application state data from the first location, as indicated at 204. In some alternative implementations the swap operation may be skipped and instead the processor may read and compress application state data directly from the main memory at 204 thus a swap operation is not required for compression of application states. Next the compressed pages of application state data are written to a second location in mass storage, as indicated at 205. This second location in mass storage is outside of the virtualized main memory space and therefore the processor does not operate in this region of mass storage as if it were main memory. After the pause in processing the processor may resume processing the application state data and process one or more image frames from the application state data, creating updated application state data which is stored as pages in the physical main memory at 206.

As before, the processor pauses and the updated application state data may (optionally) be swapped from pages in physical main memory to the virtual main memory space at the first location in mass storage at 207. The updated application data are then compressed at 208 and written to a third location in the mass storage at 209. It should be noted that compression of updated application state data is not required to be performed for each processing interval, e.g., after every image frame and may occur at an interval such as every 2 frames, every 3 frames, every 5 frames or every n frames where n number of frames is determined by an application, operating system, or based on available resources. Alternatively, n may be determined by the user.

The processor may continue to process application state data and generate image frames and updated application state data at 210 or the application may reach exit processing and compression of application states, as indicated at 211. The exit state may occur when processing reaches an end state or break in the program, alternatively, the exit state may be a user selected application processing pause to return to a previous application state or updated application state.

For many use cases, it is desirable to synchronize swapping out pages with application state compression. Instead of swapping out pages when physical memory is full or application switching, pages may be periodically copied from one location to another for application state compression.

Furthermore, because swapped memory pages will be compressed before being stored, the standard operating system process could be modified to store a swapped page in another position of physical memory instead of non-volatile memory. It is typically easier for a data compressor to working on physical memory. Only the compressed data would be stored in non-volatile memory.

As noted above, memory page swapping could be performed in synchronization with application state compression or independently of application state compression. Clean page and dirty page flags may be used in conjunction with such implementations, as discussed above.

Figure 3:
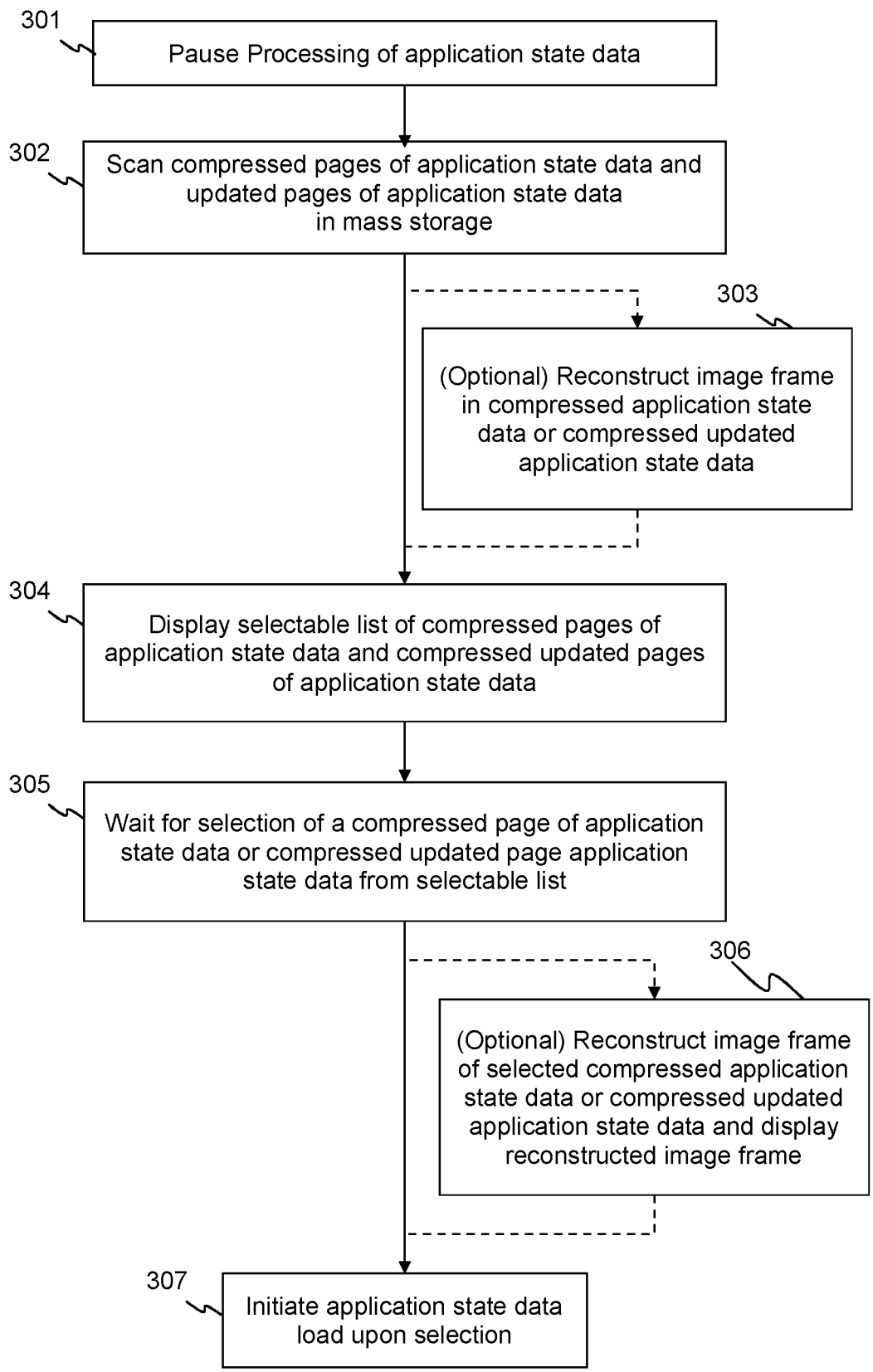
FIG. 3 is a flow diagram depicting application state selection in the method for application state compression and replay according to an aspect of the present disclosure.

FIG. 3 is a block diagram depicting application state selection in the method for application state compression and replay according to an aspect of the present disclosure. Initially the processor may enter the application state selection method from application state compression method either due to a break in application processing, such as a programmed break or application fault, or due to a user input. The processor pauses processing on the current application state data, as indicated at 301. The system may then scan the mass storage device for compressed application state data and updated application state data at 302. In some optional implementations the system may reconstruct an image frame associated with one or more states from the application state data or the updated application state data 303. Additionally, in some other alternative implementations audio associated with the one or more states from the application state data may be reconstructed from an audio buffer in the application state data or the updated application state data 303. The audio may be played over for example and without limitation a speaker and may be played with or without display of the image frame. According to aspects of the present disclosure some implementations of the application state data and updated application state data may include an associated image frame and/or an audio buffer that is compressed with the application state data or the updated application state data. Decompression of the compressed image frame and/or audio buffer in the application state data or updated application state data may reconstruct the image frame for display or audio for playback. Alternatively, the application context may be processed to reconstruct an image frame or audio buffer. Using information from the scanned compressed application state data and compressed updated application state data the system may display, or playback information corresponding to the compressed application state data and compressed updated application state data in mass storage at 304. In such an optional implementation, this information may include a reconstructed image frame or audio buffer generated from the compressed application state data or the compressed updated application state data.

In some implementations a list of compressed application state data and compressed updated application state data may be displayed, the list may be ordered chronologically. To facilitate quick chronological organization of display, each instance of compressed application state data and compressed updated application state data may include a tag which describes such attributes as date and time of creation and application instance. A display of information corresponding to the compressed application data and compressed updated application data may be generated by, for example and without limitation, displaying the information in the tag on a display screen. In some implementations this may also include displaying reconstructed image frames and/or playback of reconstructed audio buffers from the compressed data. Once information corresponding to the compressed application state data and compressed updated application state data has been displayed the processor waits at 305 for a selection to be made by the user. In some alternative implementations image frame data from the compressed application state data or compressed updated application state data may be displayed upon selection by the user 306. In some implementations audio buffer data from the compressed application state data or compressed updated application state data may be played back upon selection by the user 306 with or without display of an image frame. This implementation may reduce wasted decompression cycles while still providing functionality to the user, providing an intuitive representation idea of the selected state of the application. The decompressed image frame and/or audio buffer may be reconstructed before the user confirms that it is desired to restart the application from the chosen compressed application state or compressed updated application state. Once a compressed application state or compressed updated application state has been selected or confirmed as chosen by the user the system may begin the application using the compressed application state data or the compressed updated application state data at 307, e.g., as described below with respect to FIG. 4.

Figure 4:
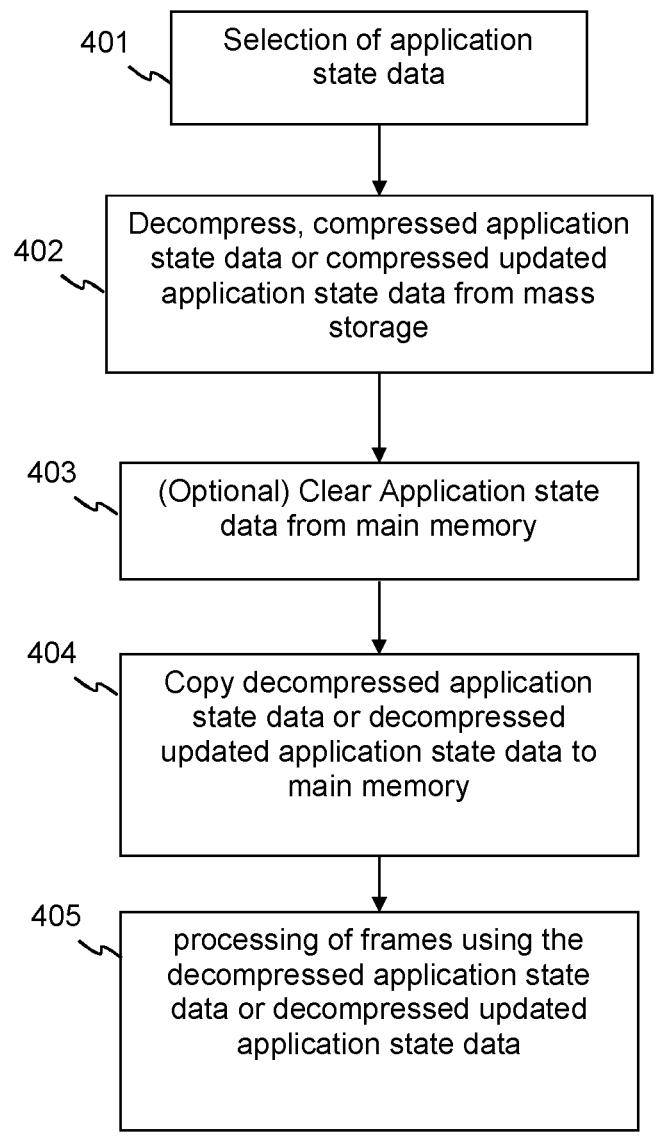
FIG. 4 is a flow diagram showing application state replay loading in the method for application state compression and replay according to an aspect of the present disclosure.

The flow diagram depicted in FIG. 4 shows application state replay loading in the method for application state compression and replay according to an aspect of the present disclosure. After selection of a compressed application state or a compressed updated application state at 401, the system will initialize processing from the compressed application state or compressed updated application state. To start, the compressed application state or compressed updated application state is decompressed, as indicated 402. In some implementations the compressed application state data or compressed updated application state data is copied to memory where the processor performs operations to decompress the data. In alternative implementations a separate processing unit such as a graphics processor or a discreet compression/decompression circuit such as a video encoder/decoder (CODEC) may perform the decompression and may copy the compressed application state data or compressed updated application state data to the reserved memory spaces for the separate processing unit. To decompress compressed application state data or updated application state data the system may use the reverse of the algorithm used to compress the data to decompress the data, which may include using the same dictionary used for dictionary encoding, using the reverse operation of a general compression algorithm or applying X-OR'd data to a base data set for interpredicted data. Before, during or after decompression, in some optional implementations, application state data in the main memory on which processing is paused, may be erased at 403 to make room for the decompressed application state data or decompressed updated application state data. Alternatively, portions of application state data in the main memory on which processing is paused may be retained and one or more pointers to the corresponding memory location(s) may be changed to the location(s) of the decompressed application state data or decompressed updated application state data when it is copied to main memory. Once the compressed application state data or compressed updated application state data is decompressed it may be copied to the main memory at 404. As discussed, the decompressed—compressed application state data or decompressed—compressed updated application state data may be copied to the same location as the previously in process application state data or updated application state data. Alternatively, as discussed above, the decompressed—compressed application state data or decompressed—compressed updated application state data may be copied to a new location in the main memory and the pointer(s) in a different table (such as a translation lookaside buffer) may be changed. Processing of the application may resume in the same manner as for a normal context switch, e.g., from one application to another application. Specifically, a regular context switch process may include a process that load registers from memory to the processor before starting the processor. Such a loading process, sometimes called an initialization, may be performed before processing resumes. Finally, after the decompressed-compressed application state data or decompressed-compressed updated application state data has been copied to main memory and any necessary initialization has been performed, the processor may be un-paused and begin processing the copied state data in main memory at 405.

Thus, in practice according to some aspects of the present disclosure a gamer could use captured game play video (reconstructed from compressed application state data and compressed updated application state data) to search for a replay point. The game video could be played forward or backward. When the gamer has found a good replay point, he or she may pause the video and start replay at that point. To enable such use case, a sequence of time codes may be embedded as a tag with both the compressed application state data and compressed updated application state data. If the gamer pauses the video at a particular frame, the video frame time code may be passed to the decompression hardware and/or software to retrieve the application state or updated application state of that time code. Note: the game video frame rate could be different from the application context capturing rate. There may not be a-one-to-one match of time codes between captured context and captured video.

Compression

Figure 5:
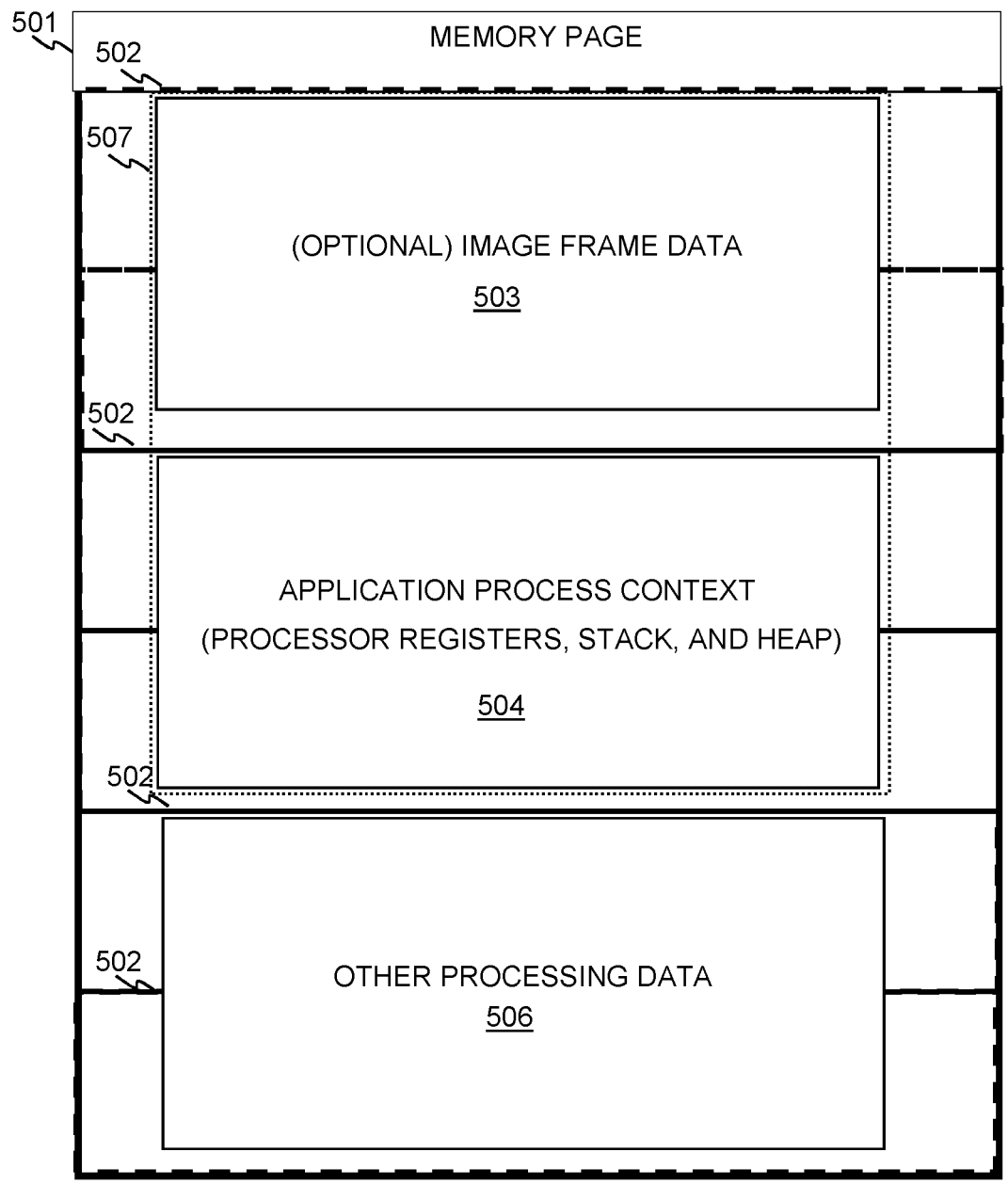
FIG. 5 is a block diagram showing the contents of a memory page containing an application state according to an aspect of the present disclosure.

The block diagram shown in FIG. 5 depicts an example of the contents of a memory page containing an application state according to an aspect of the present disclosure. As shown a memory page 501 is made up of multiple fixed size frames 502. In some alternative implementations the memory page may be made up of multiple variable sized segments, each segment size may be recorded in a table. Application state data and updated application state data 507 may span multiple frames or segments in the memory page 501. In some implementations the application state data and updated application state data may include both image frame data and/or audio buffer data 503 and associated application context data 504. Alternatively, the application state data or updated application state data may be application context data without an associated image frame or audio buffer. It should be noted that an image frame is data representing pixel values for display on a display screen. An audio buffer is data representing samples of an audio signal for playback on speaker or other sound generating device. The application context data may include application data, add main processor and GPU registers, GPU memory and GPU compute unit local memory, stack, and heap. The stack is a linear data structure that keeps track of variables used by the processor during processing in an ordered manner. The heap is a large unordered memory space for other variables and memory objects created during processing. The memory page may also contain other data such as data for other applications or operating system processes 506. While the memory page 501 is shown as being separated into frames, the memory page may be partitioned into smaller memory blocks. Larger sized compressed memory blocks may improve compression efficiency, but smaller sized blocks may be faster to compress. The compressor may determine a suitable compression model for each block. Statistically, the compression ratio of a larger block size is better. In some implementations the compressed memory blocks may be variable sized with tags or a table presenting the characteristics of the memory blocks, such as, without limitation, size, and location. In some implementations after compression the compressed application state data and compressed updated application state data may include an uncompressed tag that describes attributes of the data such as time of creation, application, and size. The tag may also indicate which portion of the compressed data is an image frame or an audio buffer. The tag may be either compressed or uncompressed. An uncompressed tag has a faster retrieving speed. A compressed tag has better compression efficiency.

Figure 6:
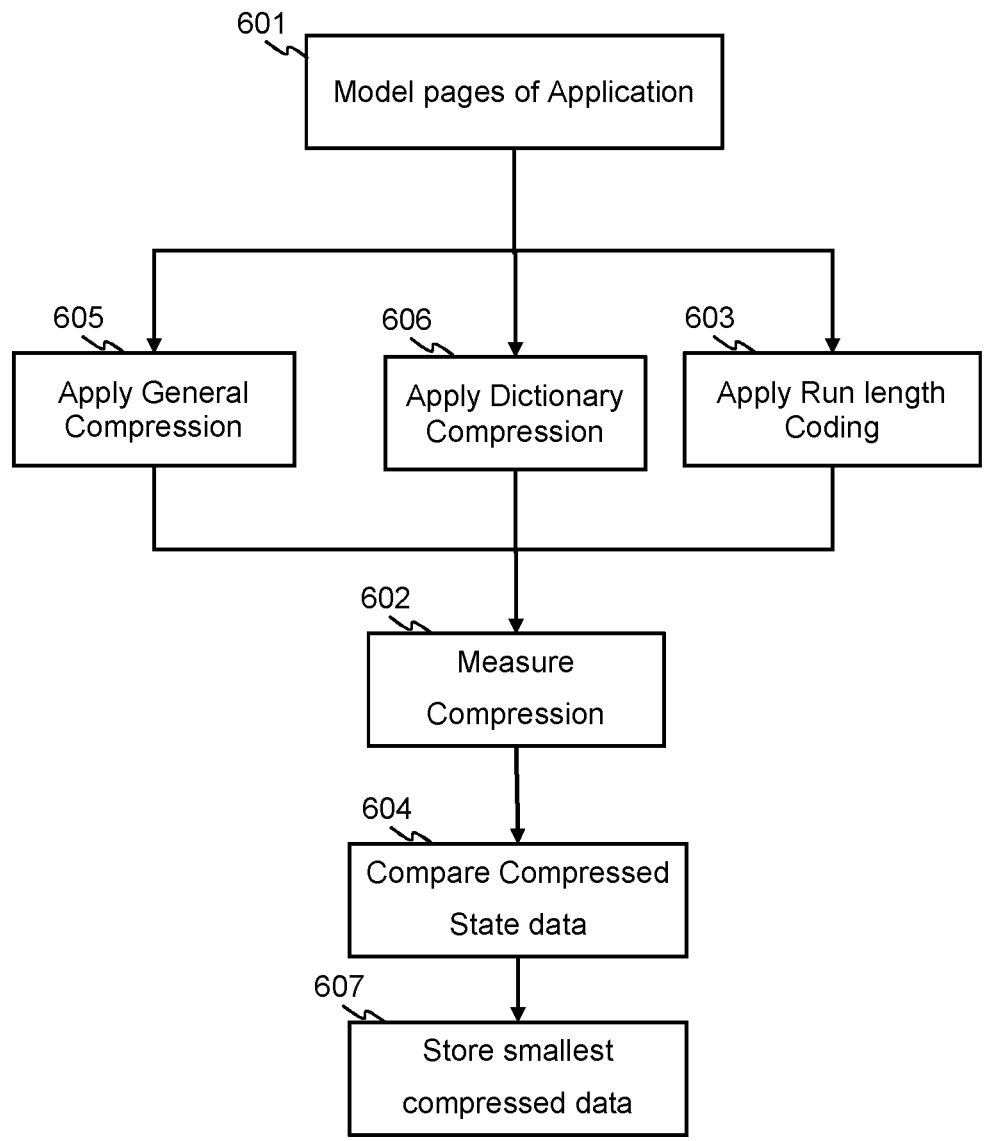
FIG. 6 is a flow diagram showing application state compression in the method for application state compression and replay according to an aspect of the present disclosure.

The flow diagram shown in FIG. 6 illustrates an example of application state compression in the method for application state compression and replay according to an aspect of the present disclosure. Initially the application state data may be modeled to find exploitable regularities within the data in a given page, block, segment or other unit of data, as indicated at 601. The modeling may determine such regularities as, number of zeros in the data, repetition of certain data strings or structures. After modeling, the device may determine the best compression algorithm by applying the different compression algorithms 605, 606, 603 and measuring the compression of the resulting compressed application state data 602. The compression may be measured using the final memory size of the compressed application state data. The memory size of the compressed application state data created by general compression 605, dictionary compression 606 and run length compression 603 may be compared at 604 to determine the compressed application state data with the smallest memory size. The smallest sized compressed application state data may then be stored in mass storage 607. In some alternative implementations a compression ratio may be taken from using final compressed file sizes. The compression ratio may be the ratio of a memory size of the compressed application state data to a memory size of the uncompressed application state data. A compression ratio may be generated for the general compression algorithm 605, the dictionary-type compression algorithm 606 and run-length coding 603. The ratios of all of the applied compression algorithms may be compared at 604 and the algorithm that results in the lowest memory size maybe chosen and stored in mass storage 607.

If it is determined from the modeling and initial compression that the unit of application state data in question contains many zero- or single-digit repetitions, run length encoding may be applied to that unit of data stored in the mass storage. Run length encoding takes each single digit repetition and reduces it from many repetitions of the single digit to a two-entry encoding that provides the digit and the number of repetitions in line with the sequence. For example and without limitation a sequence like AAAAABBBB-CCDDDDD encoded in run length encoding would be A5B4C2D5 thus reducing a 16-character sequence to 8.

The modeling data and initial compression may determine if there are any exploitable regularities within the data based on the size of the compressed application state data or compression ratio. If the application state data includes exploitable regularities, then dictionary encoding, e.g., Lemple-Ziv-Welch family (LZW) compression, DEFLATE Compression or Lemple-Ziv-Huffman-Arithmetic-Markov (LZHAM) compression, may be applied to the compressed application state data stored in the mass storage. The dictionary encoding may compress the application state data by replacing the regularities within the application state data with tokens and placing the tokenized regularities in a table (dictionary). If the regularities within the data are insufficient to encode with a dictionary compression method as determined by modeling 601 and the comparison of compressed memory sizes 604 from initial application of compression algorithms, the final compressed application state data stored in mass storage 607 may be compressed with another general compression algorithm such as for example and without limitation encoding of context tree weighting (CTW) or other similar lossless compression algorithm.

Figure 7:
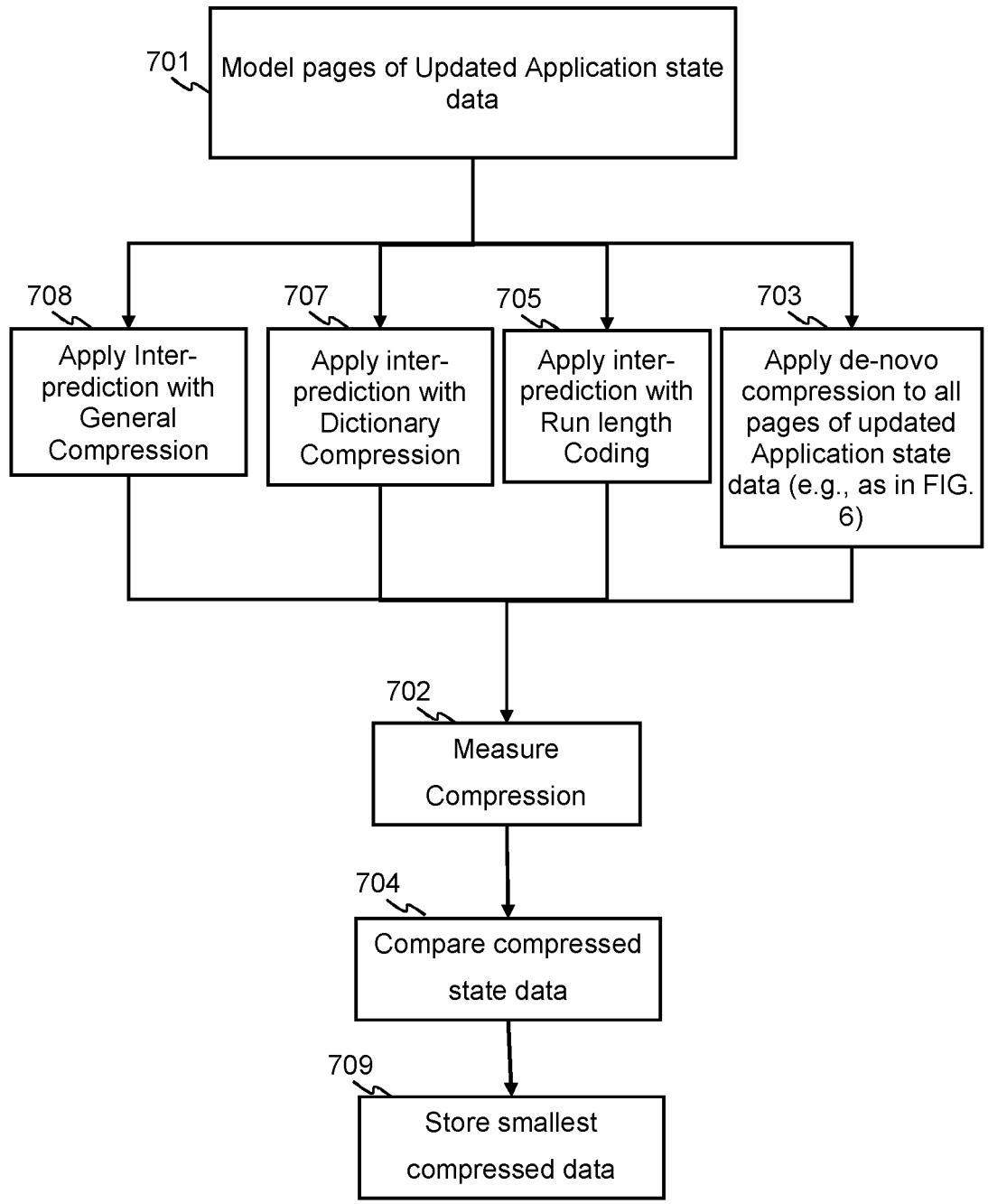
FIG. 7 is a flow diagram depicting updated application state compression in the method for application state compression and replay according to an aspect of the present disclosure.

FIG. 7 is a block diagram depicting updated application state compression in the method for application state compression and replay according to an aspect of the present disclosure. Initially, the memory page of the updated application state data is modeled to determine regularities as well as the similarities between the updated application state data and the previously generated application state data, as indicated at 701. After modeling the best compression algorithm may be determined by applying compression algorithms such as interprediction with general compression 708, interprediction with dictionary compression 707, interprediction with run length coding 705, and de-novo compression algorithms like those found in FIG. 6 703. The compression may be measured using the final memory size of the compressed application state data 702 generated by each algorithm 708, 707, 705, and 703. The memory size of the compressed application state data created by each algorithm 708, 707, 705, and 703 may be compared at 704 to determine the compressed application state data with the smallest memory size. The compressed application state data with the smallest memory size may then be stored in the mass storage 709. In some alternative implementations a compression ratio may be taken from using final compressed file sizes. The compression ratio may be the ratio of a memory size of the compressed application state data to a memory size of the uncompressed application state data. A compression ratio may be generated for each of the compression types 708, 707, 705, and 703. The ratios of all of the applied compression algorithms may be compared at 704 and the algorithm that results in the lowest memory size maybe chosen and stored in the mass store 709. The device may use the data modeling and the compressed state data memory size to determine if there are any similarities within the updated application state data with previous application state data. If there are no similarities, the device may compress the updated application state data with a de-novo compression algorithm, that is an algorithm without interprediction, e.g., as described above and shown in FIG. 6. If there are similarities between the updated application state data and previous application state data as determined by modeling 701 and application of interprediction and compression, then the device uses the data modeling and compressed data size and determines that there are numerous zero- or single-digit repetitions in the data. When many single digits or zero repetitions are found, inter-prediction with run length encoding may be applied to the updated application state data. Inter-prediction takes an exclusive-or (XOR) of the updated application state data with the previous application state data creating a page of data that only contains the difference between the updated application state data and the previous application state data. Run length encoding may be applied to the page of changed data created by the XOR operation and stored in the mass store 709 based on the comparison of compressed memory sizes at 704. The run length encoding as discussed above then removes single digit repetition strings with two entry signifiers. If there are an insufficient number of single digit repetitions the device may determine through application of the compression algorithm and the comparison at 704 that there are regularities within the data and the dictionary compression may be used for the stored compressed state data. If there are a sufficient number of regularities within the updated application state data as determined by application of the compression algorithm and the comparison 704, then inter-prediction with dictionary encoding may be used to compress with the stored updated application state data, e.g., with LZW. When paired with interprediction, dictionary encoding may use the same encoding table (dictionary) as used with the previous application state data.

If there are not a sufficient number of regularities within the updated application state data, then interprediction with a general encoding method may be applied for the stored compressed state data. As discussed above a general encoding method may be a lossless compression method for example and without limitation CTW. In some implementations there may be many updated application state data with few 'clean pages' of application state data. As such to allow random access, an independent updated application state data may be inserted and compressed as application state data (shown in FIG. 6) at intervals based on the speed of decompression. For example, and without limitation, if 50 compressed updated application states can be decompressed per second then compressed independent updated application state data could be created after every 25 compressed updated application states. The implementation in this example would create a maximum response time of half a second. If the selected updated application state data is close to an independent updated application state data, the response time could be faster. Independent updated application state data includes all memory pages and not just dirty memory pages. Additionally, if independent updated application state data is encoded according to the method shown in FIG. 6, interprediction is not applied to the independent updated application state data. Insertion of independent updated application state data may increase the memory footprint of the compressed data but may be necessary for quick access times because the decompressor must start with independent application state data and decode all updated application states between the independent context and the target context.

Additionally, with inter-prediction non-reference inter-dependent compressed application state data may be used to accelerate decompression. Adding non-reference inter-dependent updated application state data can increase independent updated application state data interval and/or reduce response delay. Non-reference inter-dependent updated application state data cannot be used to share dictionaries with contexts in the future. The pages in non-reference inter dependent updated application state data cannot be used as a reference to inter-predicted updated application state data in the future. If the decompressor must decode from an independent updated application state data to the target updated data state, it can skip non-reference inter-dependent updated application states data between them to increase the decoding speed. For the same example, if the decompressor can decode 50 compressed application states per second, and, there are two non-reference inter-dependent updated application states between every other context, the independent updated application state data interval could be increased to 75 for the same half second response delay.

Timing

Figure 8:
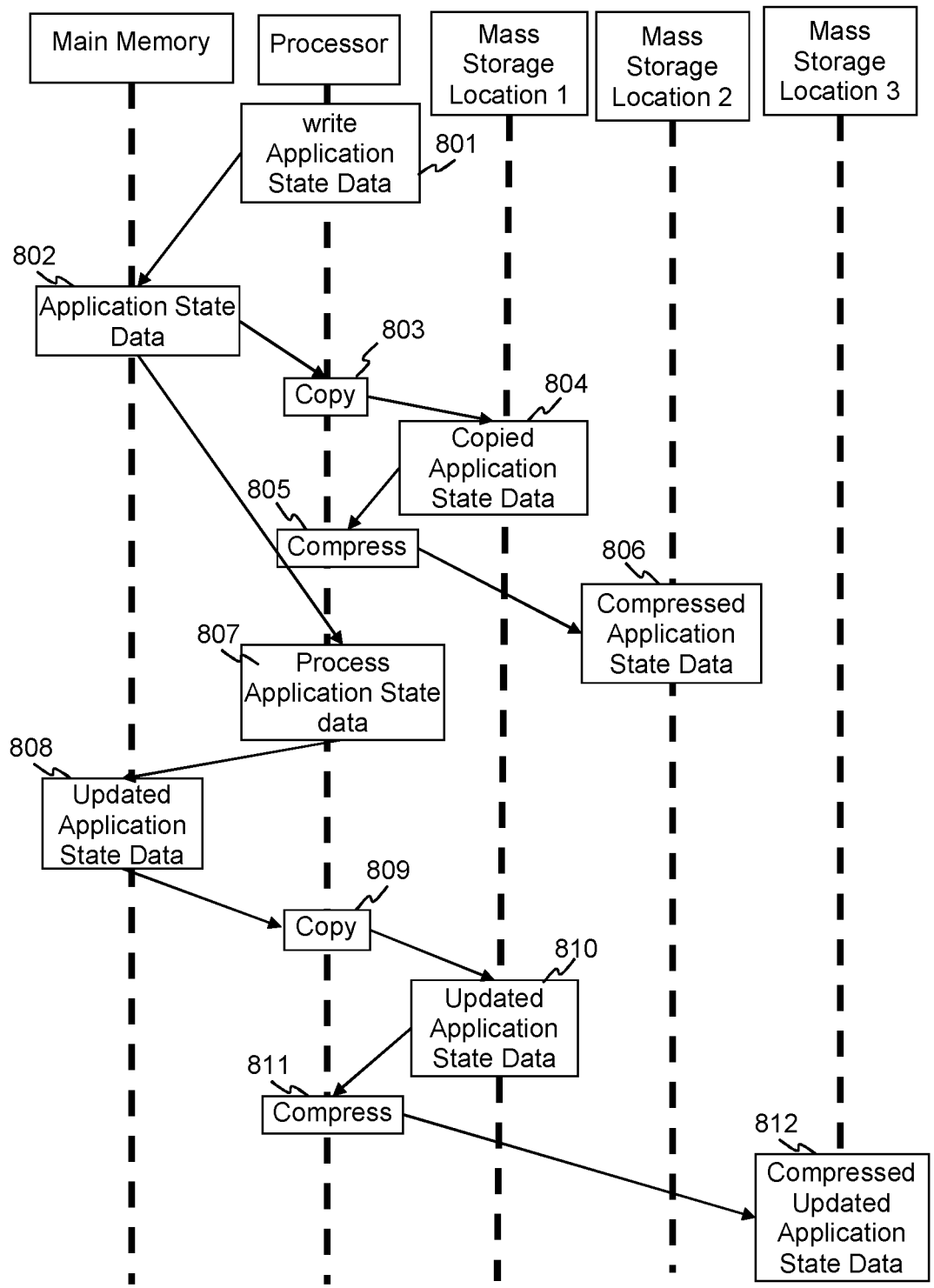
FIG. 8 is a timing diagram showing application state compression in the method for application state compression and replay according to an aspect of the present disclosure.

FIG. 8 is a timing diagram showing application state compression in the method for application state compression and replay according to an aspect of the present disclosure.

The timing state diagram of FIG. 8 shows the interplay of elements of the device including the main memory (physical main memory), the processor, mass storage location 1, mass storage location 2 and mass storage location 3. It should be noted that three mass storage locations are shown for illustration purposes, there may be a new mass storage location for each instance of compressed application state data or compressed updated application state data. Initially, as indicated at 801, the processor may write application state data 802 to the main memory. The processor may generate the application state data by processing an application or by inputs entered by a user. Once the application state data 802 is written to main memory, the processor may continue to process data and in some implementations a process switch may occur. The processor application switch may cause a pause in processing and memory management of the processor may swap the application state data out of main memory. As indicated at 803, during the swap operation the processor may copy the application state data 802 from main memory to a first mass storage location, as indicated at 804. The first mass storage location may be a virtualized main memory storage space. Depending on implementation after the swap operation the application state data may be erased from the main memory and copied back to main memory when the processor begins processing the application again (not shown). Furthermore, if the state memory is not completely swapped out by process switch, all pages may be forced to be swapped out at 803. After the Application State Data has been copied to the first mass storage location, the device may begin compression of the Application State data. The processor may compress the copied application state data 804, as indicated at 805. Alternatively, another processing unit may perform the compression, for example and without limitation a GPU or discrete compression processor or discreet video CODEC. In alternative implementations, a GPU and/or CODEC accelerator may be used for decompression. Once compressed, the Application State data is copied to a second location in the Mass Storage at 806. In some implementations, the second location in Mass Storage may be common storage instead of virtualized main memory.

After copying the compressed application state data, the device may resume processing the application state data at 807. In some implementations the processor may resume processing during compression of the application state data. In these implementations the compression may be performed by a separate core or thread of the processor or the GPU or discrete compression processor or discrete video CODEC. Processing the application state data generates updated application state data 808, which is written to the main memory. Again, the memory management of the processor may initiate a swap operation in which the updated application state data 808 in main memory is copied at 809 to the virtualized main memory space at the first mass storage location, as indicated at 810. Once copied to the mass storage location, the updated application state data may be compressed at 811 by the processor or another discrete processing unit such as a GPU, compression processor or video codec. The compressed updated application state data 812 may then be written to a third mass storage location. Note that the previous compressed application state data was not over-written this allows the previous application state data to be used for interprediction compression or as a different processing start point. By contrast during a swap operation application state data or updated application state data held in virtualized main memory space in the mass storage is erased and written over during each swap operation. Additionally, each time compressed application state data or updated application state data is written to mass storage it may be written to a new location in the Mass Storage.

Figure 9:
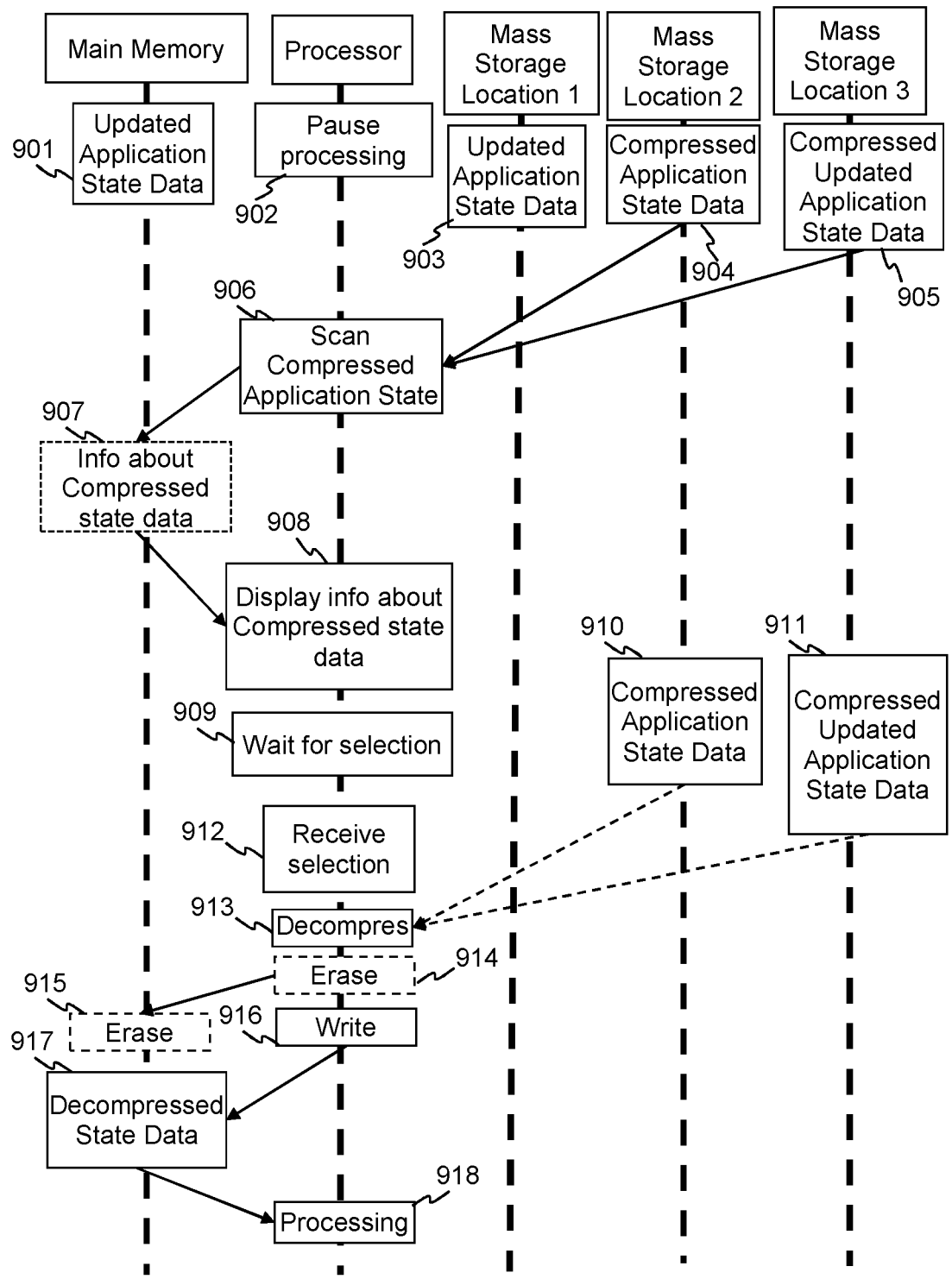
FIG. 9 is a timing diagram depicting application state loading and replay in the method for application state compression and replay according to an aspect of the present disclosure.

FIG. 9 is a timing diagram depicting application state loading and replay in the method for application state compression and replay according to an aspect of the present disclosure. At some point during processing the processor may reach a hard pause in processing, as indicated at 902. This hard pause in processing may be determined by the application or selected by the user. For example, and without limitation the application may be programed to use the compressed application states such as game saves when the application reaches an end state, such as a game over screen. Processing may be paused to allow loading of a compressed application state or a compressed updated application state. Alternatively, the user may be provided an option to pause processing and resume the application from one of the compressed application states or compressed updated application states. As shown when processing is paused the main memory may be populated with an in-process updated application state 901. The virtualized main memory space at the first Mass Storage Location may be populated with updated application state data swapped from the main memory 903. Other locations in mass storage may be populated with compressed application state data 904 and updated compressed application state data 905.

After processing is paused the device may scan the mass store at 906 to determine compressed application states 904 and compressed updated application states 905 stored therein. The device may use the uncompressed tags with the compressed application state data and compressed updated application state data to determine information 907 about the compressed data. The information about the compressed application states 904 and compressed updated application states 905 may be stored in main memory 907. In some implementations this information may include image frames or an audio buffer reconstructed from the compressed application states 904 and compressed updated application states 905. The device may display the information about the compressed application states and updated application states on a display screen, as indicated at 908. In some implementations displaying information about the compressed data may include displaying a reconstructed image frame from the compressed data. A raw image frame may be stored with the compressed data and decompression may be applied to the compressed raw image frame to reconstruct an image frame that is displayable on a screen. Multiple image frames from the compressed application state data and compressed updated application state data may be put together to reconstruct a video representation of the compressed stored states. The device may prompt the user to select an application state or updated application state from the compressed data. The device may then wait at 909 until the user selects an application state or updated application state from which to start replay.

Once the processor receives a user's selection at 912 from the compressed application state data and the compressed updated application state data it may begin loading the selected state into main memory. To load the selected compressed application state data 910 or the compressed updated application state data 911 the selected state is decompressed at 913. Before or after decompression, the paused in-process state data in the main memory may (optionally) be erased as indicated at 914, 915. The selected decompressed application state data 910 or selected decompressed updated application state data 911 is written at 916 to main memory (physical main memory) 917. Once the selected decompressed data 917 is written to main memory, the processor may begin processing 918 from the decompressed data in the main memory. Alternatively, the decompressed data may be written to a new location in main memory and a pointer in a table may be changed to point to the new location in main memory. The decompressed data in main memory represents a previous state during processing and loading the decompressed data into main memory places the data of the processor into that state during processing.

System

Figure 10:
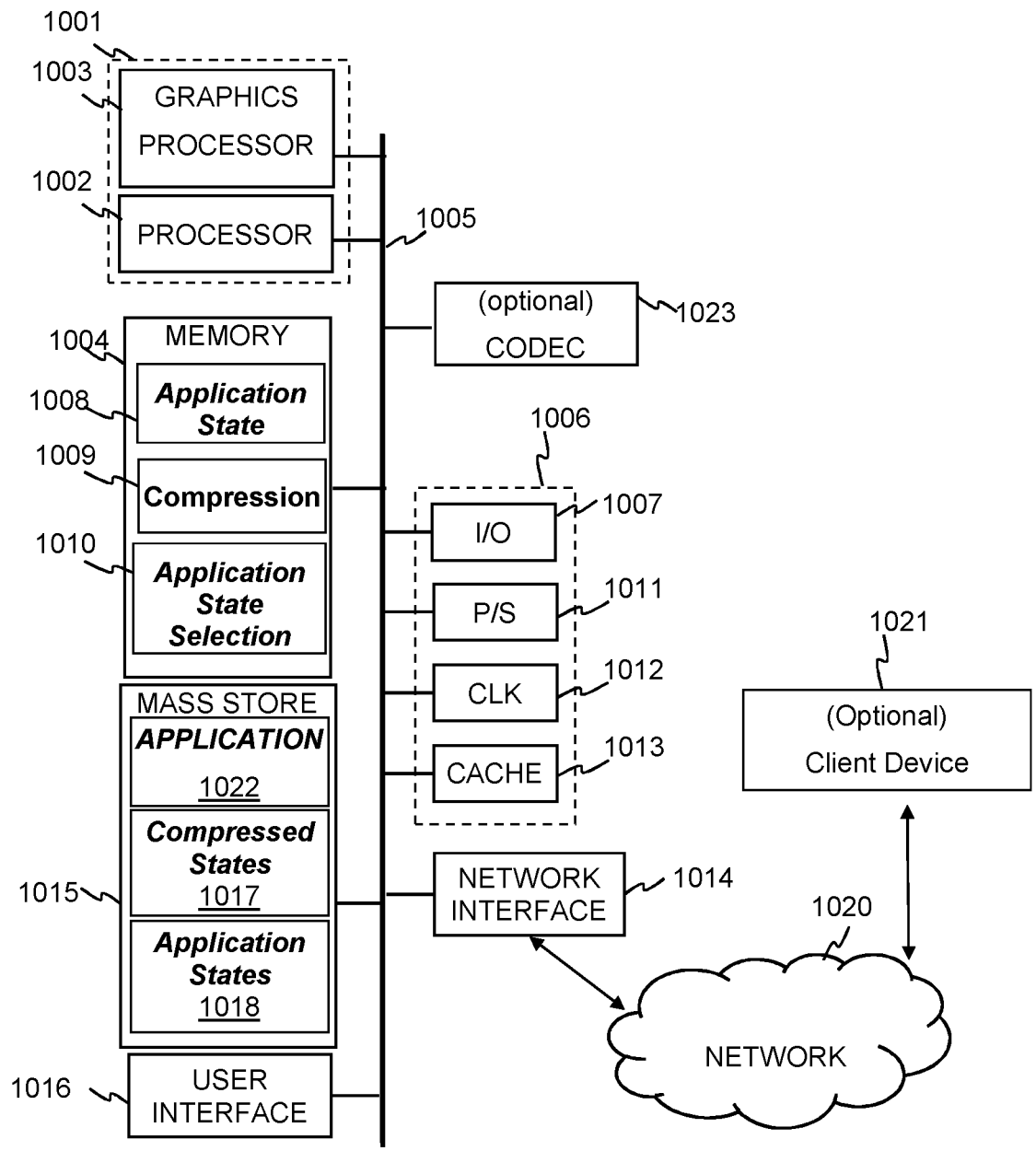
FIG. 10 is a block schematic diagram for a system implementing the method for application state compression and replay according to an aspect of the present disclosure.

FIG. 10 is a block system diagram for a system implementing the method for application state compression and replay according to an aspect of the present disclosure. By way of example, and not by way of limitation, according to aspects of the present disclosure, the system 1000 may be an embedded system, mobile phone, personal computer, tablet computer, portable game device, workstation, game console, and the like.

The system 1000 generally includes a central processor unit (CPU) 1002, a graphics processor unit (GPU) 1003, and a memory 1004 that is accessible to both the CPU and GPU. The system 1000 may also include well-known support functions 1006, which may communicate with other components of the system, e.g., via a data bus 1005. Such support functions may include, but are not limited to, input/output (I/O) elements 1007, power supplies (P/S) 1011, a clock (CLK) 1012 and cache 1013. In addition to the cache 1013, the GPU 1003 may include its own GPU cache, and the GPU may be configured so that programs running on the GPU 1003 can read-through or write-though the GPU cache.

The system 1000 may include a display device (not shown) to present rendered graphics to a user. In alternative implementations, the display device is a separate component that works in conjunction with the system, 1000. The display device may be in the form of a flat panel display, head mounted display (HMD), cathode ray tube (CRT) screen, projector, or other device that can display visible text, numerals, graphical symbols, or images.

The system 1000 includes a mass storage device 1015 such as a disk drive, CD-ROM drive, flash memory, solid state drive (SSD), tape drive, or the like to provide non-volatile storage for programs and/or data. The system 1000 may also optionally include a user interface unit 1016 to facilitate interaction between the system 1000 and a user, e.g., to provide inputs and controls to an application. The user interface 1016 may include a keyboard, mouse, joystick, light pen, game controller, or other device that may be used in conjunction with a graphical user interface (GUI). The system 1000 may also include a network interface 1014 to enable the device to communicate with other devices over a network 1020. The network 1020 may be, e.g., a local area network (LAN), a wide area network such as the internet, a personal area network, such as a Bluetooth network or other type of network. These components may be implemented in hardware, software, or firmware, or some combination of two or more of these.

The processor 1002 and graphics processor 1003 may receive and use inputs from the user interface unit 1016, during processing of an application, e.g., information corresponding to keystrokes, button presses, and the like. The processor 1002 and graphics processor 1003 may optionally communicate with a remote client device 1021 through the network interface 1014 over the network 1020. The remote client device may send inputs, such as information corresponding to keystrokes, button presses, and the like. The processor may use these inputs during execution of an application. Image frames and other application data resulting from such execution may be sent to the client device to stream the application output running on the processor 1002 and GPU 1003 to a client device. Acting as a remote host device for methods shown in FIGS. 3, 4, and 9, the processor may receive a processing pause command from the remote client device 1021 and pause processing in response, application state replay. Additionally, the processor 1002 may send information about the compressed application states and updated compressed application states 1017 stored in mass storage 1015, this may optionally include one or more reconstructed image frames and/or audio buffers from the compressed application states 1017. The processor may receive a selection from the remote client device 1021 of a compressed application state or a compressed updated application state 1017 in mass storage 1015 to restart processing from.

The CPU 1002 and GPU 1003 may each include one or more processor cores, e.g., a single core, two cores, four cores, eight cores, or more. In some implementations, the CPU 1002 and GPU 1003 may be cores or multiple cores of the same Accelerated Processing Unit (APU) 1001. Where the CPU or GPU is a multi-core processor underutilized cores may be used for state compression or decompression of stored states. For example and without limitation a free or underutilized core may perform the decompression while other cores process other uncompressed data. Underutilized cores could be used for compression while the application is running in parallel.

The memory 1004 may be in the form of an integrated circuit that provides addressable memory, e.g., random access memory (RAM), dynamic random access memory (DRAM), synchronous dynamic random access memory (SDRAM), and the like. The memory 1004 may include a dedicated graphics memory that may store graphics resources and temporarily store graphics buffers of data for a graphics rendering pipeline. In the example shown in FIG. 10, the graphics memory is shown as part of the application state data 1008 in main memory 1004. In alternative implementations, the graphics memory could be a separate hardware component, possibly integrated into the GPU 1003. The main memory 1004 may include application state data or updated application state data 1008 used by the processor 1002 and (optionally) the GPU 1003 while processing. The application state data may be a snapshot of the state of data being processed by the processor that has been moved or copied from registers to main memory and updated application state data may be changed application state data that has not yet been moved from main memory to the mass storage also referred to as a dirty page. Register data is the most volatile data. As the first step to get updated application state data, the register data is copied to memory 1004. As noted above, where "dirty page" flags are used it is desirable to synchronize memory swap operations with application state compression operations. The application state data and updated application state data 1008 may be stored in memory pages in the Memory 1004. During processing, the processor may pause processing and swap pages of application state data 1008 out of main memory 1004 and into a virtualized main memory space located in the mass storage 1015 thus in some implementations uncompressed application state data or uncompressed updated application state data 1018 may be stored in a virtualized main memory space of the mass storage 1015. This virtualized main memory space appears to the processor as part of the main memory despite being located on the mass storage random access memory 1015.

According to aspects of the present disclosure and as discussed in FIGS. 1, 2 and 8 during processing, the application state or updated application state 1008 from main memory may be compressed and the compressed application state or compressed updated application state 1017 may be stored in locations in the mass storage 1015. Additionally, the main memory may include compression programs or algorithms 1009 for use by the processor. In some alternative implementations the graphics processor 1003 may perform the compression. Or in some other alternative implementations another discrete processor for example and without limitation a discrete video CODEC 1023 may perform the compression. The Mass Storage 1015 may contain Application or Program data 1022 that is loaded to the main memory 1004 when processing begins on the application or program 1022. As shown in FIG. 5 the memory pages in the main memory may include application state data that includes application context data and that is created by the processor during processing of the application data 1022. The main memory 1004 may also contain application state selection data 1010 which may include information about compressed application state data 1017 stored in the Mass Storage 1015 and application replay selection and loading as shown in FIGS. 3, 4 and 9. The application state selection 1010 data in some implementations may also include one or more reconstructed frames from the compressed application state data or compressed updated application state data 1017.

By way of example, and not by way of limitation, the CPU 1002 and GPU 1003 may access the memory 1004 via the bus or busses 1005. In some cases, it may be useful for the system 1000 to include two or more different buses. The memory 1004 may contain data that can be accessed by the CPU 1002 and GPU 1003. The GPU 1003 may include a plurality of compute units configured to perform graphics processing tasks in parallel. Each compute unit may include its own dedicated local memory store, such as a local data share. Alternatively, the compute units may each access the memory 1004 or a dedicated graphics memory.

As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC includes the following hardware components:

One or more processor cores (e.g., microcontroller, microprocessor, or digital signal processor (DSP) cores.

Memory blocks, e.g., read only memory (ROM), random access memory (RAM), electrically erasable programmable read-only memory (EEPROM) and flash memory.

Timing sources, such as oscillators or phase-locked loops.

Peripherals, such as counter-timers, real-time timers, or power-on reset generators.

External interfaces, e.g., industry standards such as universal serial bus (USB), FireWire, Ethernet, universal asynchronous receiver/transmitter (USART), serial peripheral interface (SPI) bus.

Analog interfaces including analog to digital converters (ADCs) and digital to analog converters (DACs).

Voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC.

A typical SoC includes both the hardware components described above, and executable instructions (e.g., software or firmware) that control the processor core(s), peripherals, and interfaces.

Aspects of the present disclosure allow for rapid access to previous execution states of an application and restarting of the application from a selected previous state. Such a capability has applications to video gaming and other forms of computer simulation, such as flight simulators, driving simulators and ship navigation simulators.

While the above is a complete description of the preferred embodiment of the present invention, it is possible to use various alternatives, modifications, and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for application replay, comprising:
compressing application state data from a main memory;
writing the compressed application state data to a first location in a mass storage;
generating updated application state data, wherein generating the updated application state data comprises processing two or more image frames;
compressing, after processing the two or more image frames, the updated application state data from the main memory; writing updated application state data to a second location in the mass storage;
pausing processing on the application state data and updated application state data;
scanning compressed application state data and compressed updated application state data stored in the mass storage;
using information from the scanned compressed application state data and compressed updated application state data to display information corresponding to compressed application state data and updated compressed application state data stored in the mass storage.

2. The method of claim 1, further comprising:
decompressing selected compressed application state data or selected compressed updated application state data stored in the mass storage; writing decompressed application state data or decompressed updated application state data to the main memory; processing of the decompressed application state data or decompressed updated application state data in main memory.

3. The method of claim 2, further comprising clearing paused in-process application state data or in-process updated application state data from the main memory before writing the decompressed application state data or decompressed updated application state data to the main memory.

4. The method of claim 2, wherein processing of the decompressed application state data or decompressed updated application state data in main memory includes restarting an application at a point in processing of the application that the application state data or updated application state data was generated before compression.

5. The method of claim 1, further comprising reconstructing an image frame from the compressed application state data or the compressed updated application state data.

6. The method of claim 5, wherein displaying information corresponding to the compressed application data and updated application data includes displaying a reconstructed image frame from the compressed application state data or the compressed updated application state data.

7. The method of claim 5, wherein displaying information corresponding to the compressed application data and updated application data includes playing a reconstructed buffer of audio from the compressed application state data or the compressed updated application state data.

8. The method of claim 1, further comprising reconstructing an audio buffer from the compressed application state data or the compressed updated application state data.

9. The method of claim 1, wherein compressing the application state data or compressing the updated application state data further includes determining a compression type to apply to the application state data or the updated application state data.

10. The method of claim 9, wherein determining the compression type includes determining whether to apply run length coding, dictionary type compression or a general compression algorithm.

11. The method of claim 10, wherein the general compression algorithm includes Context tree Weighting (CTW) and dictionary type compression includes Lempel-Ziv-Welch compression, Lempel-Ziv-Huffman-Arithmetic-Markov (LZHAM) compression or DEFLATE compression.

12. The method of claim 9, wherein compressing the updated application state data includes determining whether to apply interprediction to the update application state data.

13. The method of claim 12, wherein applying inter prediction to the updated application state data includes taking an exclusive-or between the application state data and updated application state data.

14. The method of claim 13, wherein applying inter-prediction to the updated application state data further includes dictionary compression of inter predicted and sharing a compression dictionary with compressed application state data.

15. The method of claim 1, wherein application state data and updated application state data includes an image frame and application context.

16. The method of claim 15, wherein the application conte'''−1 includes processor registers, stack, and heap.

17. The method of claim 15, wherein the application state data further includes emulated device state data.

18. The method of claim 1, wherein displaying information corresponding to compressed application state data and updated compressed application state data stored in the mass storage further includes sending the information to a remote client.

19. The method of claim 18, wherein the processing is paused in response to a request from a remote client.

20. The method of claim 1, further comprising copying the application state data from a physical main memory to a virtual main memory space before compressing the application state data and comprising copying the updated application state data from the physical main memory to the virtual main memory space before compressing the updated application state data.

21. The method of claim 20, wherein the virtual main memory space includes a portion of non-volatile memory reserved for the virtual main memory space.

22. The method of claim 1, wherein compressing the updated application state data includes compressing updated application state data after a set interval of images frames are processed.

23. The method of claim 22, wherein the set interval of image frames is defined by a user or the application state data.

24. A system for application replay, comprising:
a processor;
a main memory coupled to the processor;
a mass storage coupled to the main memory and the processor;
instructions embodied in the main memory that when executed by the processor cause the processor to carry out the method for application replay including;
compressing application state data from the main memory;
writing the compressed application state data to a first location in the mass storage;
generating updated application state data, wherein generating the updated application state data comprises processing two or more image frames;
compressing, after processing the two or more image frames, the updated application state data from the main memory;
writing updated application state data to a second location in the mass storage; pausing processing on the application state data and updated application state data;
scan compressed application state data and compressed updated application state data stored in the mass storage;
using information from the scanned compressed application state data and compressed updated application state data to display information corresponding to compressed application state data and updated compressed application state data stored in the mass storage.

25. A non-transitory, computer readable medium having executable instructions embodied thereon the executable instructions, when executed by a computer cause the computer to carry out the method for application replay comprising:
compressing application state data from a main memory;
writing the compressed application state data to a first location in a mass storage; generating updated application state data, wherein generating the updated application state data comprises processing two or more image frames;
compressing, after processing the two or more image frames, the updated application state data from the main memory; writing updated application state data to a second location in the mass storage;
pausing processing on the application state data and updated application state data; scan compressed application state data and compressed updated application state data stored in the mass storage;
using information from the scanned compressed application state data and compressed updated application state data to display information corresponding to compressed application state data and updated compressed application state data stored in the mass storage.

* * * * *